United States Patent [19]

Shiroshita

[11] Patent Number: 5,757,922
[45] Date of Patent: May 26, 1998

[54] METHOD AND SYSTEM FOR PACKET SCRAMBLING COMMUNICATION WITH REDUCED PROCESSING OVERHEAD

[75] Inventor: Teruji Shiroshita, Kanagawaken, Japan

[73] Assignee: Nippon Telegraph & Telephone Corp., Tokyo, Japan

[21] Appl. No.: 761,434

[22] Filed: Dec. 6, 1996

[30] Foreign Application Priority Data

Dec. 8, 1995 [JP] Japan ................... 7-320903
Mar. 29, 1996 [JP] Japan ................... 8-077602

[51] Int. Cl.[6] ................ H04L 9/00; H04L 9/34
[52] U.S. Cl. ............. 380/42; 380/9; 380/48; 380/49; 380/50
[58] Field of Search ................ 38/9, 28, 29, 37, 38/43, 49, 50, 59, 4, 23, 25, 48

[56] References Cited

U.S. PATENT DOCUMENTS

| 4,727,579 | 2/1988 | Wright et al. | 380/37 X |
|---|---|---|---|
| 5,086,469 | 2/1992 | Gupta et al. | 380/48 |
| 5,455,863 | 10/1995 | Brown et al. | 380/23 |
| 5,455,865 | 10/1995 | Perlman | 380/49 |

FOREIGN PATENT DOCUMENTS 4-181282  6/1992  Japan ................ H04L 9/00

*Primary Examiner*—Bernarr E. Gregory
*Attorney, Agent, or Firm*—Banner & Witcoff, Ltd.

[57] ABSTRACT

A packet scrambling communication scheme capable of reducing the processing amount and the processing time required for the scrambling processing and the descrambling processing at the transmitting side and the receiving side. The original data is scrambled at the transmitting side, by dividing the original data into a plurality of data units in packet sizes, assembling packets by storing the data units into the packets and attaching false packet identifiers indicating a scrambled packet order to the packets, and transmitting the packets in the scrambled packet order according to the false packet identifiers from the transmitting side to the network. The packets received from the network are descrambled at the receiving side, by recovering a data unit order information indicating a descrambled order of the data units from the false packet identifiers, and reconstructing the original data from the data units stored in the packets according to the data unit order information.

20 Claims, 21 Drawing Sheets

FIG.3
PRIOR ART
(1) SCRAMBLING PROCESSING
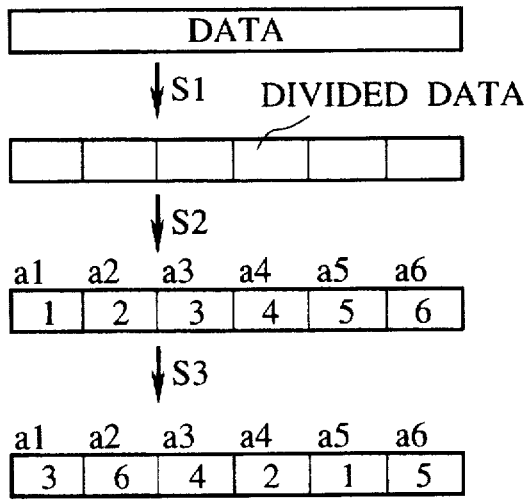
(2) PACKET TRANSMISSION PROCESSING
P1: DATA DIVIDED INTO PACKET SIZES
(PACKET SIZE DIFFERENT FROM DIVISION SIZE OF (1))
GIVEN TO 2200
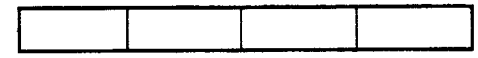
P2: IDENTIFIER ATTACHED TO EACH PACKET
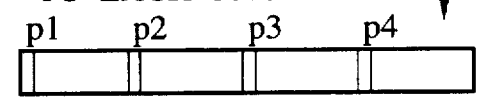
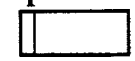
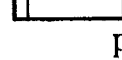
TRANSMISSION TO NETWORK
(4) DESCRAMBLING PROCESSING
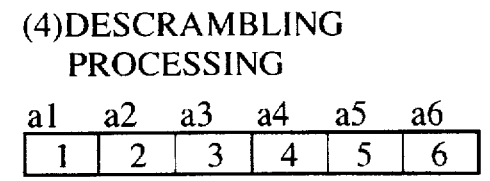
↑ D2
D1 { 3→a3  4→a4  1→a1
      6→a6  2→a2  5→a5
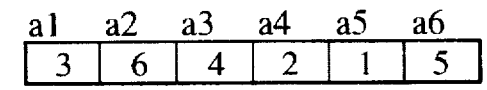
↑ GIVEN TO 2500
(3) PACKET RECEIVING PROCESSING
R1: PACKETS RECEIVED WHILE RE-ORDERING
p1   p2   p3   p4
RECEIVING FROM NETWORK
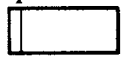
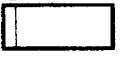

FIG.5

(a) SCRAMBLING & PACKET TRANSMISSION PROCESSING

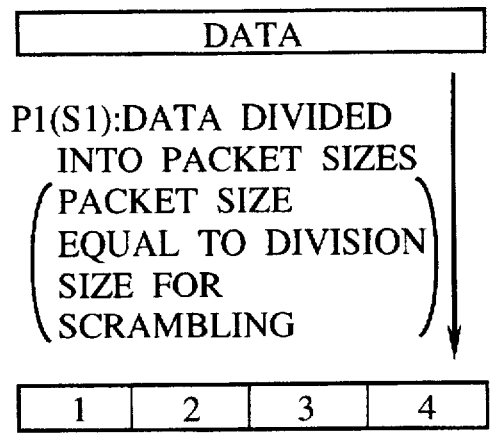

P1(S1): DATA DIVIDED INTO PACKET SIZES
(PACKET SIZE EQUAL TO DIVISION SIZE FOR SCRAMBLING)

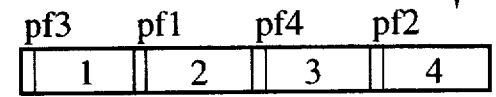

P2(S2): PACKET ASSEMBLED

S3: FALSE IDENTIFIER pfx ATTACHED TO EACH PACKET

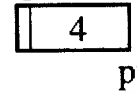

TRANSMISSION TO NETWORK IN FALSE IDENTIFIER ORDER (b) DESCRAMBLING & PACKET RECEIVING PROCESSING

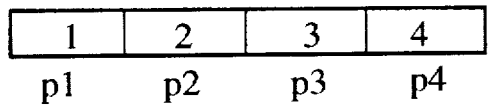

R1(D2): ORIGINAL DATA RECONSTRUCTED FROM PACKETS

D1: RECEIVING FROM NETWORK WHILE RECOVERING TRUE IDENTIFIER

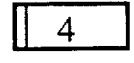
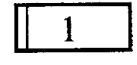
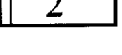
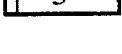

FIG.6

(a) SCRAMBLING & PACKET TRANSMISSION PROCESSING

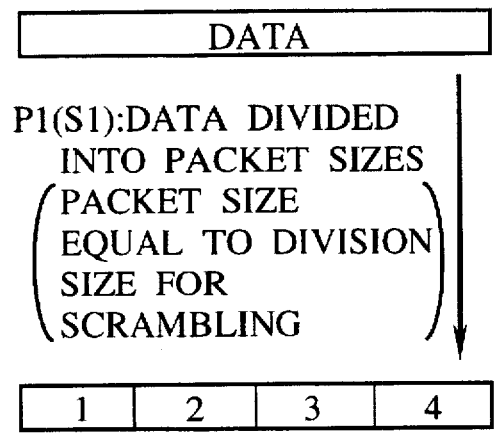

P1(S1): DATA DIVIDED INTO PACKET SIZES
(PACKET SIZE EQUAL TO DIVISION SIZE FOR SCRAMBLING)

P2(S2): TRUE IDENTIFIER px ATTACHED TO EACH PACKET

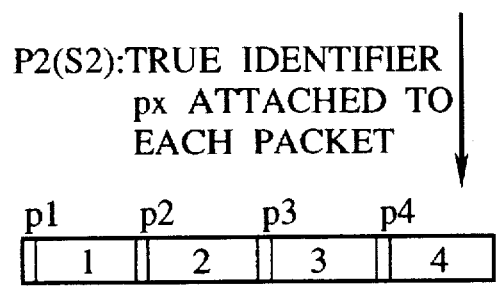

S3: TRUE IDENTIFIER px REPLACED BY FALSE IDENTIFIER pfx

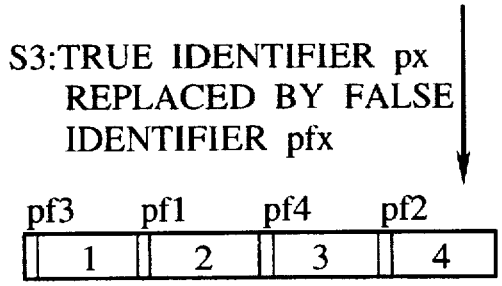

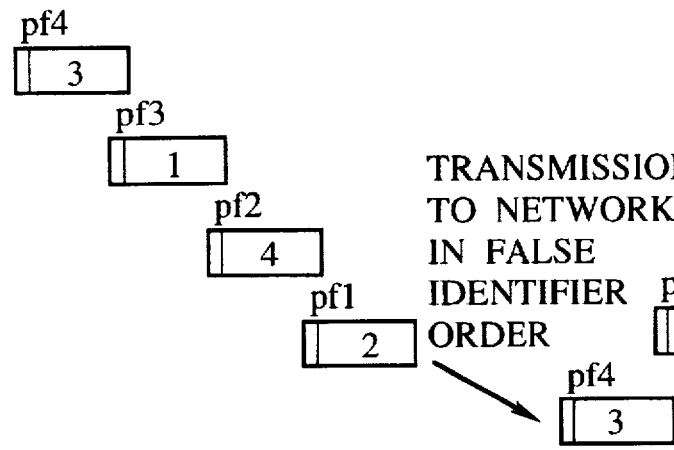

TRANSMISSION TO NETWORK IN FALSE IDENTIFIER ORDER

(b) DESCRAMBLING & PACKET RECEIVING PROCESSING

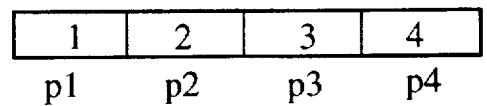

R1(D2): ORIGINAL DATA RECONSTRUCTED FROM PACKETS

D1: RECEIVING FROM NETWORK WHILE COVERTING FALSE IDENTIFIER pfx INTO TRUE IDENTIFIER px

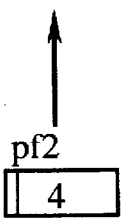

FIG. 7
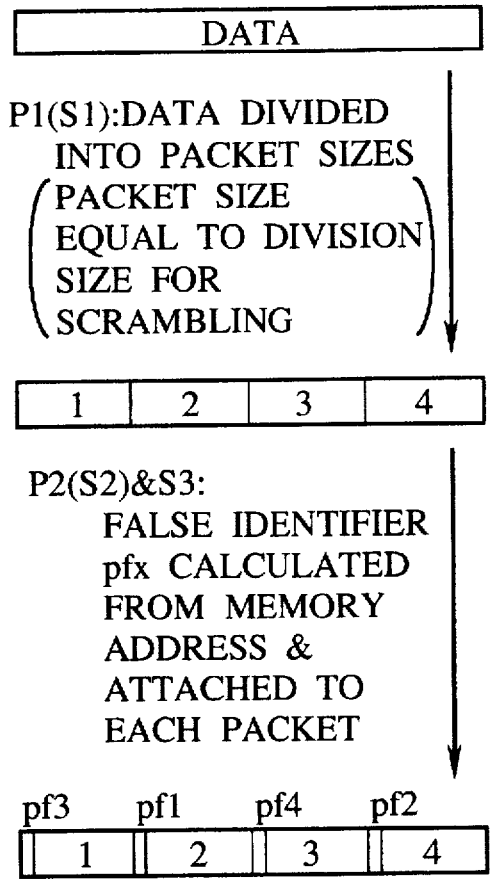
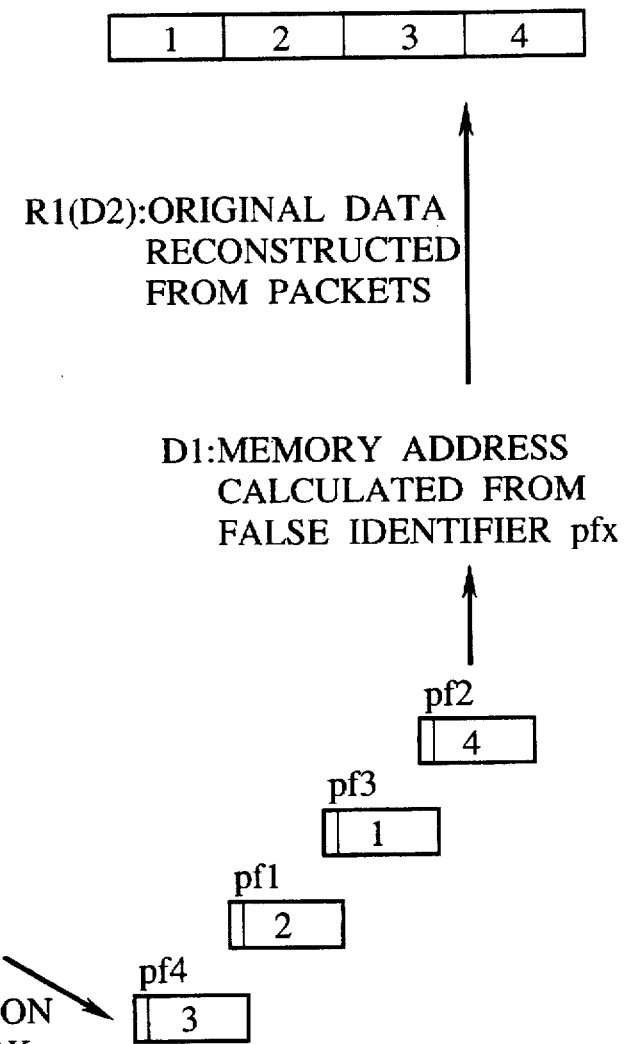

METHOD AND SYSTEM FOR PACKET SCRAMBLING COMMUNICATION WITH REDUCED PROCESSING OVERHEAD

BACKGROUND OF THE INVENTION

1. Field of the Invention

The present invention relates to a method and a system for packet scrambling communication suitable for a fee-charging information delivery service in which a system (network) makes the delivered information valuable to registered terminal users by making it difficult for a non-registered terminal to obtain (or read) the delivered information content, and more particularly, to a method and a system for packet scrambling communication which can realize the scrambling and descrambling of the delivery information without requiring a processing overhead due to the scrabling processing to a server operator and a processing overhead due to the descramling processing to a terminal user.

2. Description of the Background Art

In a case where a server delivers an information to a user through a network, in order to prevent a non-registered terminal from receiving and utilizing the delivered information without permission, there is a method in which transmission data is scrambled by dividing transmission data and transmitting divided data in a different order, and after data is received, received data is descrambled by a user using a key distributed in advance.

FIG. 1 shows a system for realizing a conventional data transfer scheme using scrambling delivery. This system of FIG. 1 comprises a server 1100, a terminal 1200, and a communication network 1300 connecting the server 1100 and the terminal 1200. The server 1100 further comprises an application unit 1110, a data transmission unit 1120, and a communication control unit 1130, while the terminal 1200 further comprises an application unit 1210, a data receiving unit 1220, and a communication control unit 1230.

In this system of FIG. 1, at the server 1100 side, the scrambling processing is carried out on the entire original data A at the application unit 1110 before the actual transmission, so as to generate the scrambled data A'. Then, the scrambled data A' is divided into transfer data units (packets) at the data transmission unit 1120, and the transfer data units (packets) are transmitted to the terminal 1200 through the communication control unit 1130 and the communication network 1300.

At the terminal 1200 side, the transfer data units (packets) are received through the communication network 1300 and the communication control unit 1230, and the entire scrambled data A' is reconstructed from the received transfer data units (packets) at the data receiving unit 1220. Then, the entire original data A is recovered by descrambling the scrambled data A' at the application unit 1210.

Note that, in the data communication, the data transfer is usually managed by dividing the transmission data into transfer data units (packets) and assigning identifiers to the transfer data units.

However, in the conventional data transfer scheme using scrambling delivery, the entire original data (file) is to be scrambled before the data transfer so that the scrambling processing requires a considerable amount of time at the server side. Similarly, the entire received data is to be descrambled so that the descrambling processing requires a considerable amount of time at the terminal side. For this reason, there has been a problem that a procedure required for a user to obtain the received data is both time-consuming as well as tedious.

In further detail, the conventional data transfer scheme using scrambling delivery will be described with references to FIG. 2 and FIG. 3.

As shown in FIG. 2, in the conventional system, the transmitting side has an application 2100 for carrying out the scrambling processing (S1, S2, S3) and a protocol processing section 2200 for carrying out the packet transmission processing (P1, P2), while the receiving side has a protocol processing section 2400 for carrying out the packet receiving processing (R1) and an application 2500 for carrying out the descrambling processing (D1, D2), and the transmitting side and the receiving side are connected through a communication network 2300.

The processing carried out at each section is illustrated in FIG. 3 and as follows.

(1) Scrambling processing:

S1: The entire data is divided into appropriate division sizes.

S2: A data identifier such as a sequence number or a memory address (a number labelling each divided data in FIG. 3) is attached to each divided data obtained by S1, or assigned to each divided data and managed separately.

S3: The divided data are permutated along with their data identifiers according to a prescribed scrambling key.

(2) Packet transmission processing:

P1: Data to be transmitted are stored into packets, where the packet size is different from the division size used in the scrambling processing (1).

P2: The ordered packet identifiers (sequence numbers) px are attached to the packets for the sake of the packet ordering and the transfer management such as retransmission.

The packets are then transmitted from the transmitting side to the communication network 2300, and then received at the receiving side. Here, in general, the order of the packets are changed in the communication network 2300 so that the packets are not necessarily received in the order by which they are transmitted.

(3) Packet receiving processing:

R1: The entire data is reconstructed by storing the received packets at correct addresses according to their packet identifiers px.

(4) Descrambling processing:

D1: The original data identifiers of the divided data stored in the packets are recovered according to a prescribed descrambling key.

D2: The original data is recovered by permuting the divided data according to the recovered original data identifiers.

Note that the protocol processings of the packet transmission processing (P1, P2) and the packet receiving processing (R1) are required in the packet data communication regardless of whether the scrambling delivery is used or not.

In this conventional scheme of FIG. 3, the scrambling processing is carried out separately from the packet transmission processing, and the descrambing processing is carried out separately from the packet receiving processing. Consequently, in the conventional data transfer scheme using scrambling delivery, the scrambling processing and the descrambling processing entirely required the additional processing amount and the additional processing time.

On the other hand, in the past, the network was operated as a closed network in which the communication channel equipements connected with the network subscriber equipments (servers, terminals) and the relay equipements are both belonging to the same communication service provider, but in recent years, the network interfaces are opened to many communication service providers and the VAN (Value Added Network) service providers, so that a composite network connecting the equipments of more than one service providers is now in use. In the network of a sigle service provider, the physical network including the subscriber channels and the relay equipments itself is hard to access from the external, and the interfaces between different equipements are not opened, so that the secrecy of the communication data can be maintained. However, in the composite network of more than one service providers, there are possibilities for the non-registered users to obtain the communication data without permission at junction points of the equipments of different service providers or at junction points of the relay equipment of each service provider and the channel connected with the terminal.

SUMMARY OF THE INVENTION

It is therefore an object of the present invention to provide a method and a system for packet scrambling communication capable of reducing the processing amount and the processing time required for the scrambling processing and the descrambling processing at the transmitting side and the receiving side.

It is another object of the present invention to provide a method and a system for packet scrambling communication capable of realizing a highly reliable data communication service in a case of using a composite network in which a plurality of networks are connected with each other.

According to one aspect of the present invention there is provided a method for packet scrambling communication between a transmitting side and a receiving side connected through a network, comprising the steps of: scrambling original data at the transmitting side, by dividing the original data into a plurality of data units in packet sizes, assembling packets by storing the data units into the packets and attaching false packet identifiers indicating a scrambled packet order to the packets, and transmitting the packets in the scrambled packet order according to the false packet identifiers from the transmitting side to the network; descrambling the packets received from the network at the receiving side, by recovering a data unit order information indicating a descrambled order of the data units from the false packet identifiers, and reconstructing the original data from the data units stored in the packets according to the data unit order information.

According to another aspect of the present invention there is provided a system for packet scrambling communication, comprising: a network; a transmission device connected with the network, including: scrambling processing means for scrambling original data, by dividing the original data into a plurality of data units in packet sizes, and assembling packets by storing the data units into the packets and attaching false packet identifiers indicating a scrambled packet order to the packets; and transmission means for transmitting the packets in the scrambled packet order according to the false packet identifiers to the network; and a receiving device connected with the network, including: receiving means for receiving the packets from the network; and descrambling processing means for descrambling the packets, by recovering a data unit order information indicating a descrambled order of the data units from the false packet identifiers, and reconstructing the original data from the data units stored in the packets according to the data unit order information.

Other features and advantages of the present invention will become apparent from the following description taken in conjunction with the accompanying drawings.

BRIEF DESCRIPTION OF THE DRAWINGS

FIG. 3 is a diagram showing a processing flow of a conventional packet scrambling communication method.

FIG. 5 is a diagram showing a processing flow of a packet scrambling communication method according to the present invention.

FIG. 6 is a diagram showing a processing flow of a first embodiment of a packet scrambling communication method according to the present invention.

FIG. 7 is a diagram showing a processing flow of a second embodiment of a packet scrambling communication method according to the present invention.

DETAILED DESCRIPTION OF THE PREFERRED EMBODIMENTS

First, with references to FIG. 4 to FIG. 7, the major features of a method and a system for packet scrambling communication according to the present invention will be described.

Figure 1:
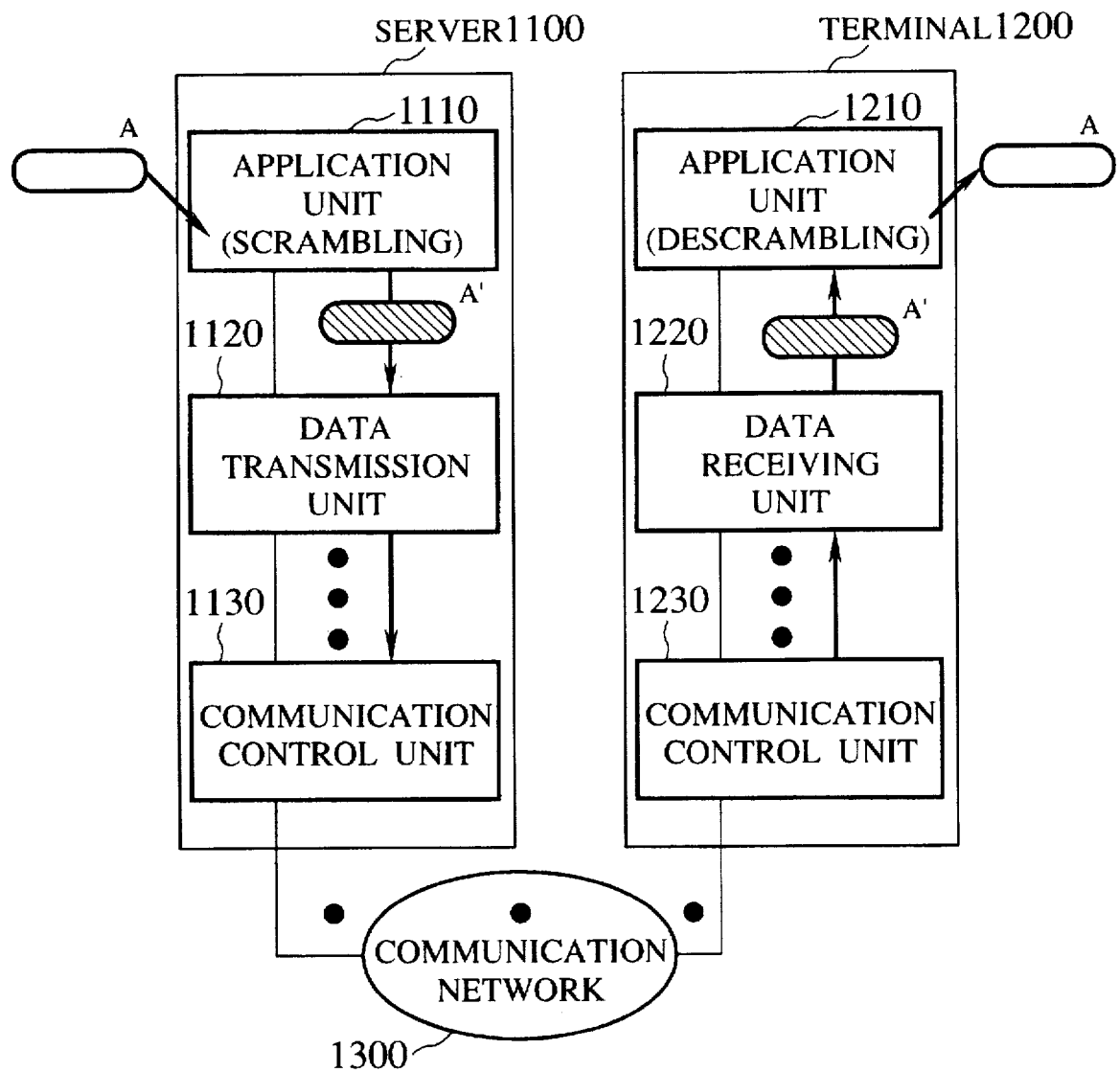
FIG. 1 is a schematic block diagram of a conventional packet scrambling communication system.
Figure 2:
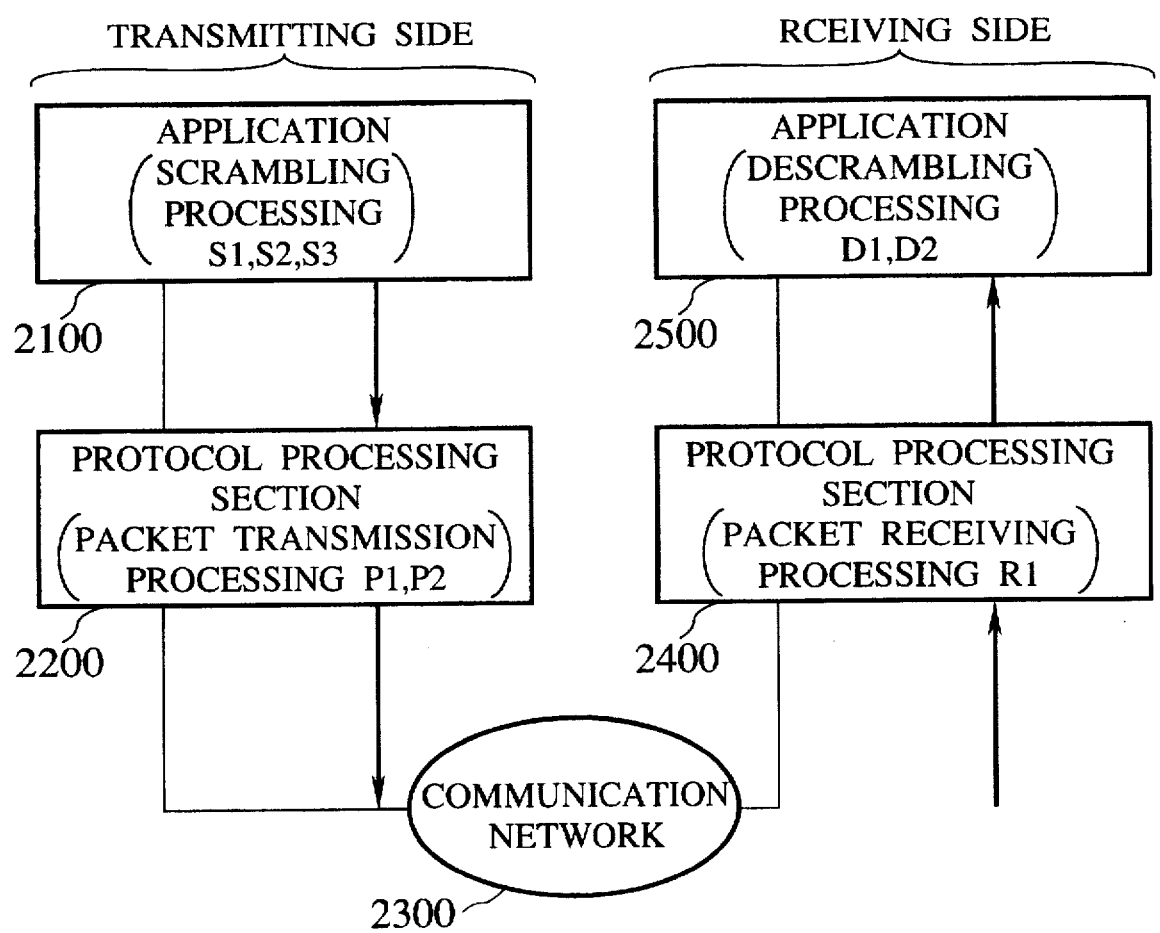
FIG. 2 is a block diagram showing a functional configuration of a conventional packet scrambling communication system.
Figure 4:
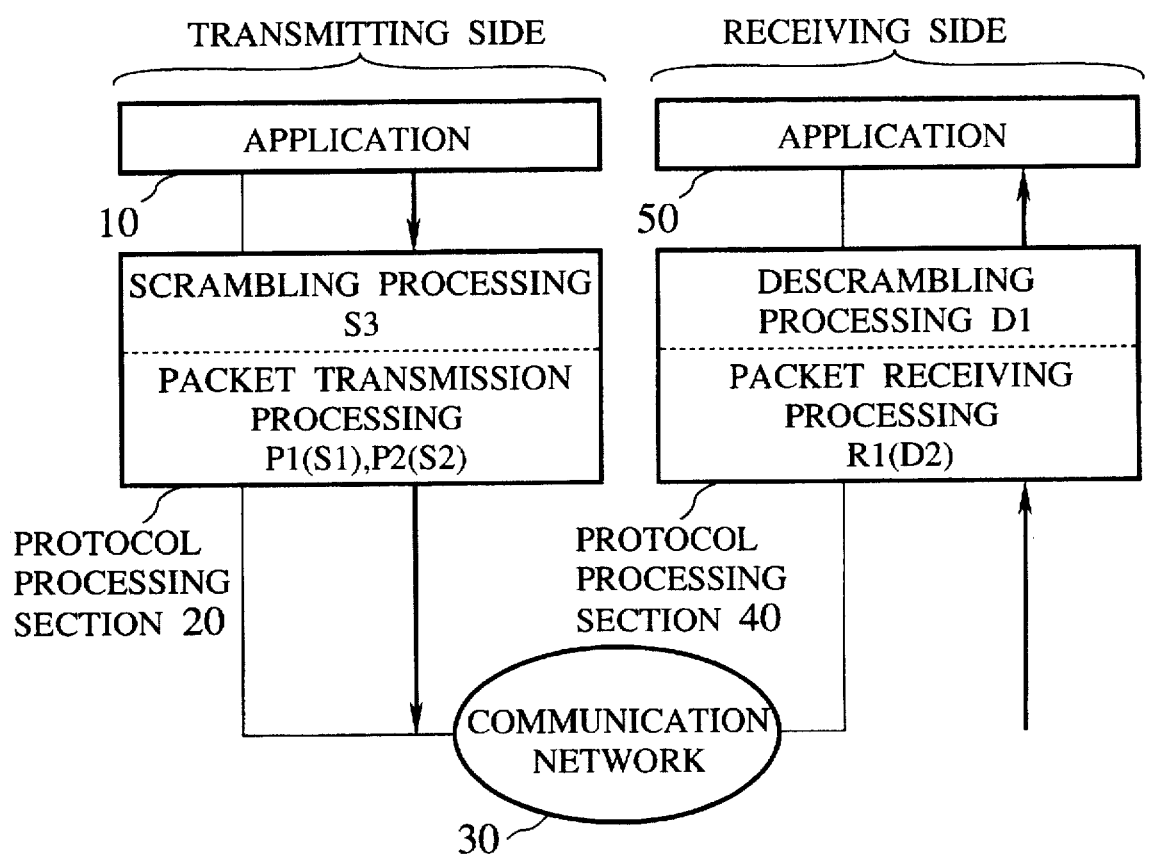
FIG. 4 is a block diagram showing a functional configuration of a packet scrambling communication system according to the present invention.

FIG. 4 shows a basic configuration of a packet scrambling communication system according to the present invention, in which the transmitting side has an application 10 for providing data and a protocol processing section 20 for carrying out the scrambling processing (S3) and the packet transmission processing (P1(S1), P2(S2)), while the receiving side has a protocol processing section 40 for carrying out the packet receiving processing (R1(D2)) and the descrambling processing (D1) and an application 50 for obtaining data, and the transmitting side and the receiving side are connected through a communication network 30.

The processing carried out at each section is illustrated in FIG. 5 and as follows.

(a) Scrambling and packet transmission processing:

P1(S1): The entire data is divided into packet sizes which are equal to appropriate division sizes for the scrambling. (Note that a number labelling each divided data in FIG. 5 is a divided data sequence number for identifying each divided data.)

P2(S2): Packets are assembled.

S3: A false packet identifier pfx is attached to each packet.

The packets are then transmitted from the transmitting side to the communication network 30, and then received at the receiving side. Here, in general, the order of the packets are changed in the communication network 30 so that the packets are not necessarily received in the order by which they are transmitted.

(b) Descrambling and packet receiving processing:

D1: The packets are received while recovering a true packet identifier px of each packet.

R1(D2): The entire original data is reconstructed from the packets.

In this packet scrambling communication method of the present invention, S1 and S2 of the scrambling processing are carried out as parts of P1 and P2 of the packet transmission processing, while D2 of the descrambling processing is carried out as a part of R1 of the packet receiving processing. Consequently, even in a case of using scrambling delivery, S1, S2 and D2 are carried out by the protocol processing, and therefore there is no need to require the additional processing amount and the additional processing time for them. Thus, according to the present invention, it is possible to reduce the processing amount and the processing time for the majority (S1, S2, D2) of the scrambling processing and the descrambling processing by executing the scrambling processing and the descrambling processing as parts of the protocol processing.

More specifically, in the first embodiment of the packet scrambling communication according to the present invention which will be described in detail below, the packet scrambling communication is carried out as illustrated in FIG. 6 and as follows.

Namely, in the scrambling and packet transmission processing, at P1(S1), the entire data is divided into packet sizes which are equal to appropriate division sizes for the scrambling.

Then, at P2(S2), the packets are assembled while a true packet identifier px is attached to each packet.

Then, at S3, the true packet identifier px is replaced by a false packet identifier pfx.

On the other hand, in the descrambling and packet receiving processing, at D1, the packets are received while the false packet identifier pfx is convered into the true packet identifier px.

Then, at R1(D2), the entire original data is reconstructed from the packets according to their true packet identifiers px.

In contrast, in the second embodiment of the packet scrambling communication according to the present invention which will be described in detail below, the packet scrambling communication is carried out as illustrated in FIG. 7 and as follows.

Namely, in the scrambling and packet transmission processing, at P1(S1), the entire data is divided into packet sizes which are equal to appropriate division sizes for the scrambling.

Then, at P2(S2) and S3, the packets are assembled while a false packet identifier pfx is directly calculated from the memory address of the divided data in each packet and attached to each packet.

On the other hand, in the descrambling and packet receiving processing, at D1, the packets are received while the memory address of the divided data is directly calculated from the false packet identifier pfx.

Then, at R1(D2), the entire original data is reconstructed from the packets according to the memory addresses of the divided data.

Now, with references to FIG. 8 to FIG. 14, the first embodiment of a method and a system for packet scrambling communication according to the present invention will be desribed in detail.

Figure 8:
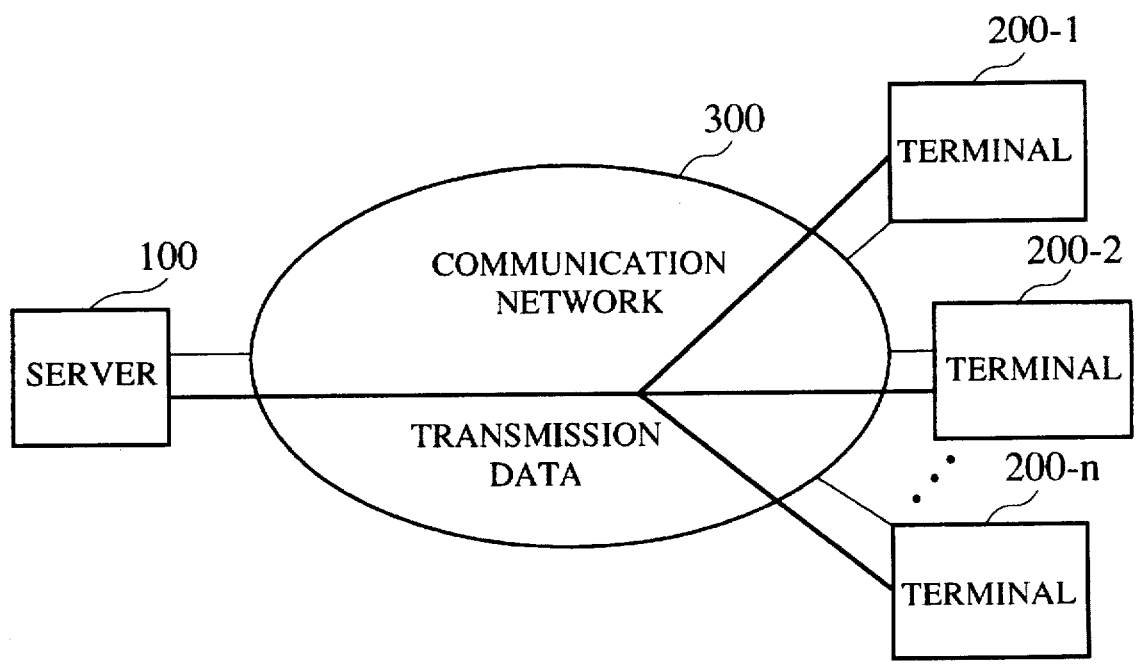
FIG. 8 is a schematic block diagram of an information delivery system according to the first and second embodiments of the present invention.

FIG. 8 shows an information delivery system in this first embodiment, which comprises a server 100, a plurality of terminals 200-1 to 200-n, and a communication network 300 connecting the server 100 and the terminals 200-1 to 200-n. In this system of FIG. 8, the server 100 transmits the scrambled data to the terminals 200-1 to 200-n, and each terminal 200 descrambles the received data.

Figure 9:
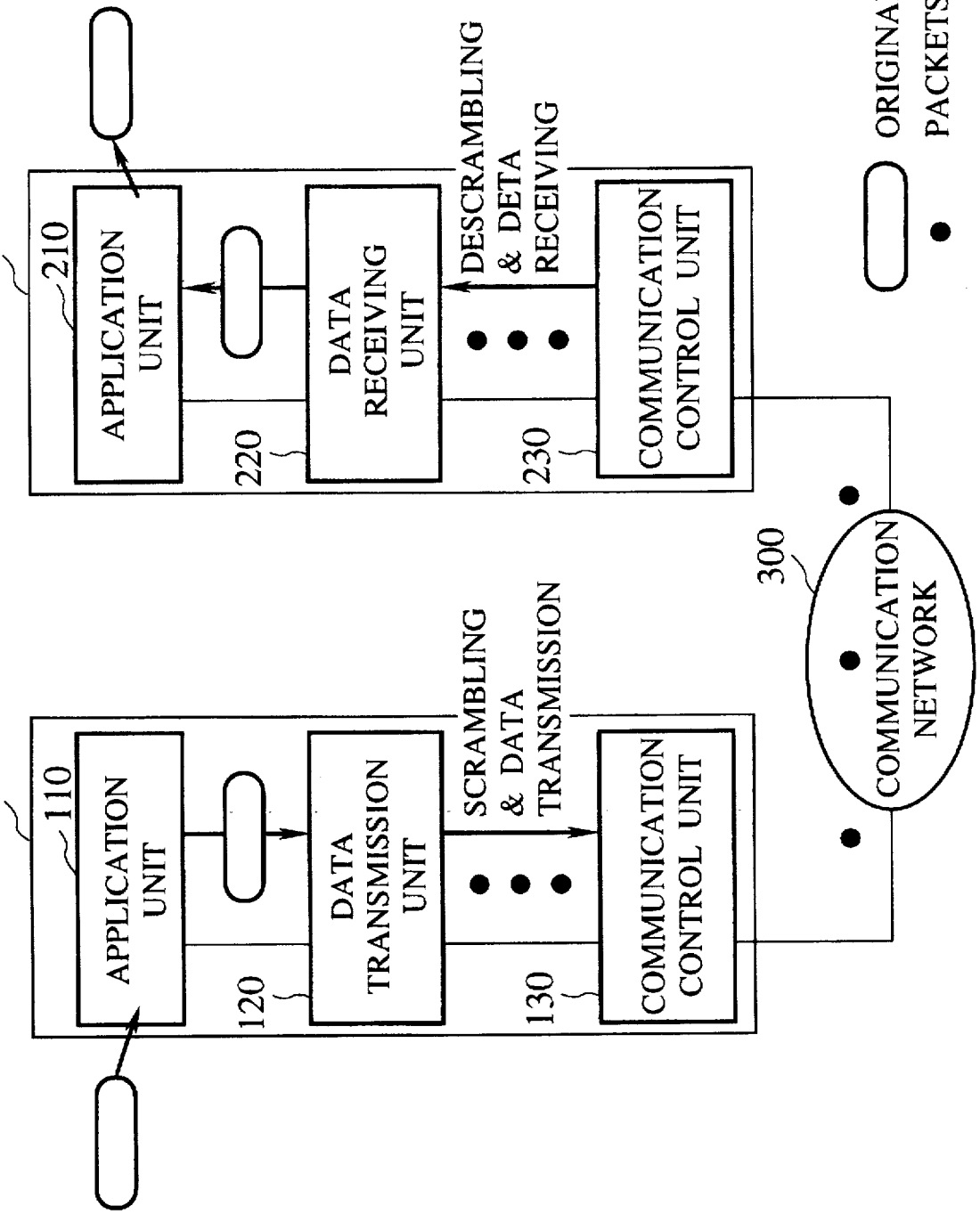
FIG. 9 is a schematic block diagram of a packet scrambling communication system according to the first and second embodiments of the present invention.

FIG. 9 shows internal configurations of the server 100 and the terminal 200 in the system of FIG. 8.

As shown in FIG. 9, the server 100 further comprises an application unit 110, a data transmission unit 120, and a communication control unit 130, while the terminal 200 further comprises an application unit 210, a data receiving unit 220, and a communication control unit 230.

In the server 100, the entire data to be transmitted to the terminal 200 is given from the application unit 110 to the data transmission unit 120.

Then, the data transmission unit 120 divides the entire data into packets, permutes their identifiers (sequence numbers) according to a prescribed scrambling key, and transfers the resulting packets to the communication control unit 130.

The communication control unit 130 then transmits the packets generated by the data transmission unit 120 to the terminal 200 through the communication network 300.

In the terminal 200, the communication control unit 230 receives the packets transmitted from the server 100, and transfers the received packets to the data receiving unit 220.

Then, the data receiving unit 220 reconstructs the entire data while descrambling the packet sequence numbers of the packets according to a prescribed descrambling key, and transfers the reconstructed entire data to the application unit 210.

Figure 10:
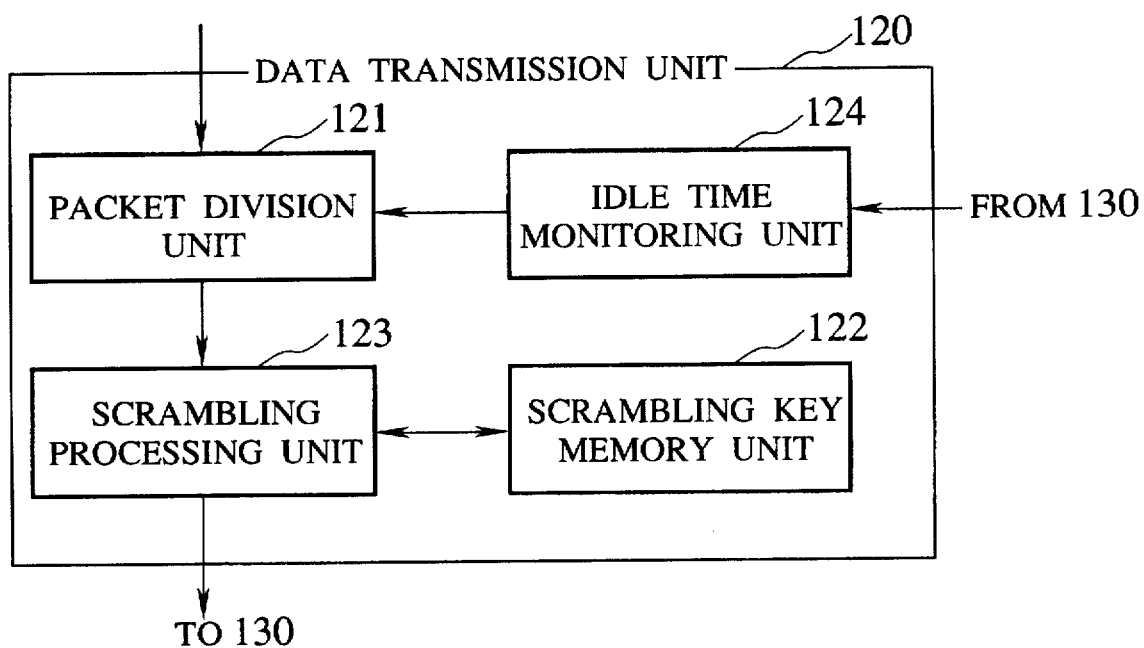
FIG. 10 is a block diagram of a data transmission unit in the packet scrambling communication system of FIG. 9 according to the first embodiment of the present invention.

FIG. 10 shows a detail configuration of the data transmission unit 120 in the server 100. In the data transmission unit 120, when the data for one file for example is given from the application unit 110, the processing for dividing that data for one file into packets is carried out. As shown in FIG. 10, this data transmission unit 120 comprises a packet division unit 121, a scrambling key memory unit 122, a scrambling processing unit 123, and an idle time monitoring unit 124.

The packet division unit 121 divides the entire data given from the application unit 110 into packet sizes, and transfers the obtained packets to the scrambling processing unit 123. The scrambling key memory unit 122 stores a prescribed scrambling key which is shared with the terminal 200. The scrambling processing unit 123 refers to the scrambling key stored in the scrambling key memory unit 122, and attaches a packet sequence number according to the scrambling key to each divided packet, so as to generate a data packet in a format shown in FIG. 11.

Figure 11:
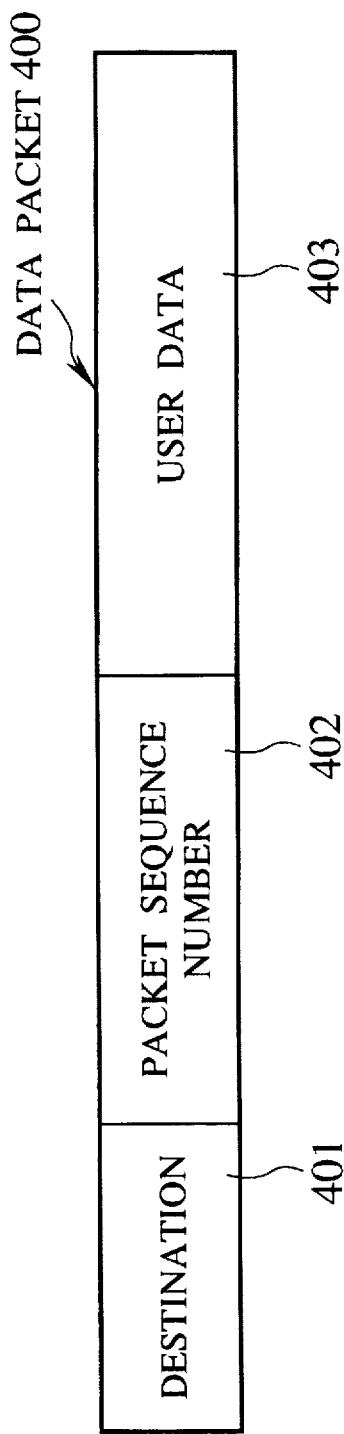
FIG. 11 is a diagram showing a format of a data packet used in the present invention.

In the format of FIG. 11, the data packet 400 comprises a destination 401, a packet sequence number 402, and a user data 403. A destination address of the receiving side is set in the destination 401, and a packet sequence number obtained by the scrambling processing unit 123 is set in the packet sequence number 402, while one divided unit of data (message) is set in the user data 403. Note that when the destination 401 is not given, the data is stored into a packet of a lower hierarchical level according to the communication hierarchy.

The idle time monitoring unit 124 will be described in detail below.

Figure 12:
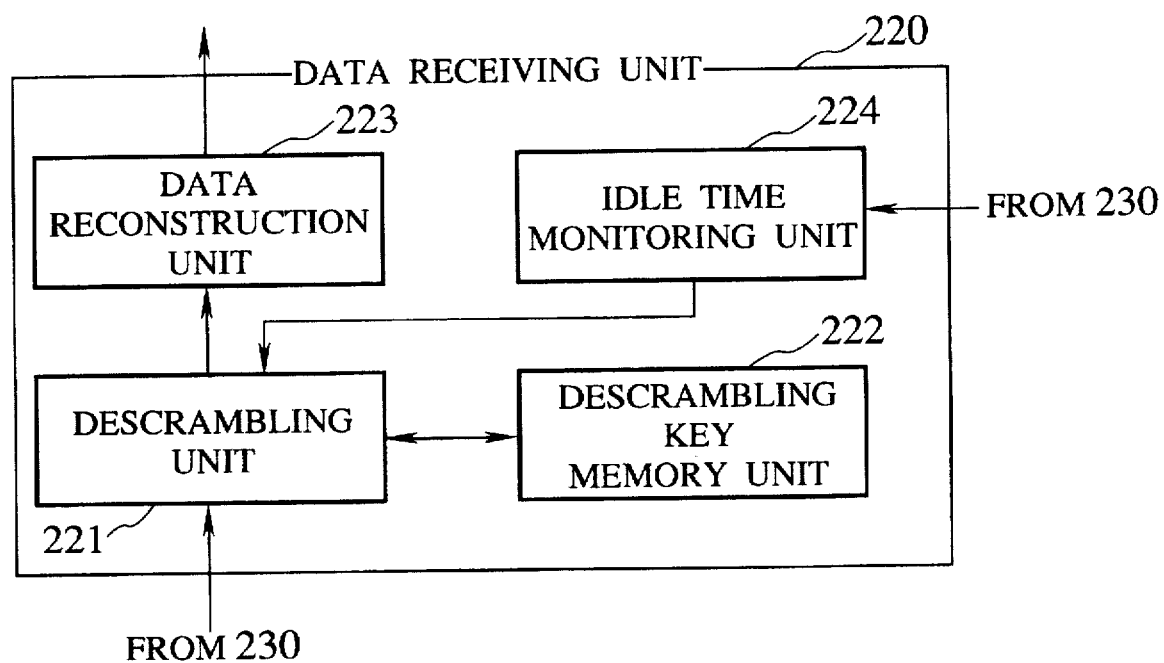
FIG. 12 is a block diagram of a data receiving unit in the packet scrambling communication system of FIG. 9 according to the first embodiment of the present invention.

FIG. 12 shows a detail configuration of the data receiving unit 220 in the terminal 200. As shown in FIG. 12, this data receiving unit 220 comprises a descrambling unit 221, a descrambling key memory unit 222, a data reconstruction unit 223, and an idle time monitoring unit 224.

The descrambling key memory unit 222 stores a prescribed descrambling key which is shared with the server 100. The descrambling unit 221 refers to the descrambling key stored in the descrambling key memory unit 222, and descrambles the packet sequence number 402 of the data packet 400 given from the communication control unit 230 (that is, converts the false packet sequence number into the true packet sequence number).

The data reconstruction unit 223 holds each data packet descrambled by the descrambling unit 221, and reconstructs the original data (data of the server side) by rearranging the packets into a correct data order according to the sequence number when all the data packets are received.

The idle time monitoring unit 224 will be described in detail below.

Now, in this first embodiment, the processing up to the packet transmission and the processing after the packet receiving as described above are carried out during idle times of the transmission processing by the server 100 and the receiving processing by the terminal 200, and the idle time monitoring units 124 and 224 are provided in the data transmission unit 120 and the data receiving unit 220 for this purpose.

The idle time monitoring units 124 and 224 monitor the communication control units 130 and 230, respectively, and when an idle time at which the transmission processing or the receiving processing is not carried out is detected, the idle time monitoring unit 124 of the server 100 activates the packet division unit 121, or the idle time monitoring unit 224 of the terminal 200 activates the descrambling unit 221.

Figure 13:
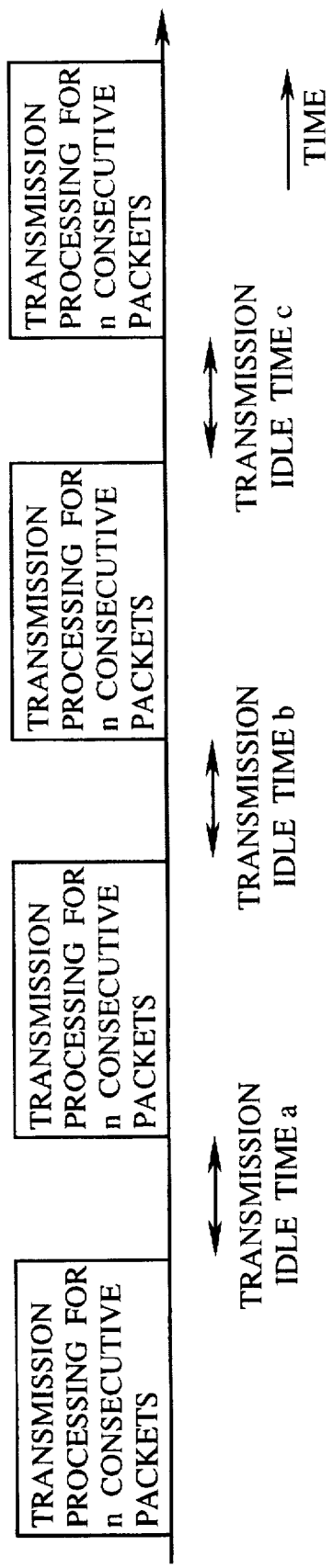
FIG. 13 is a diagram showing idle times at a transmitting side used in the first embodiment of the present invention.
Figure 14:
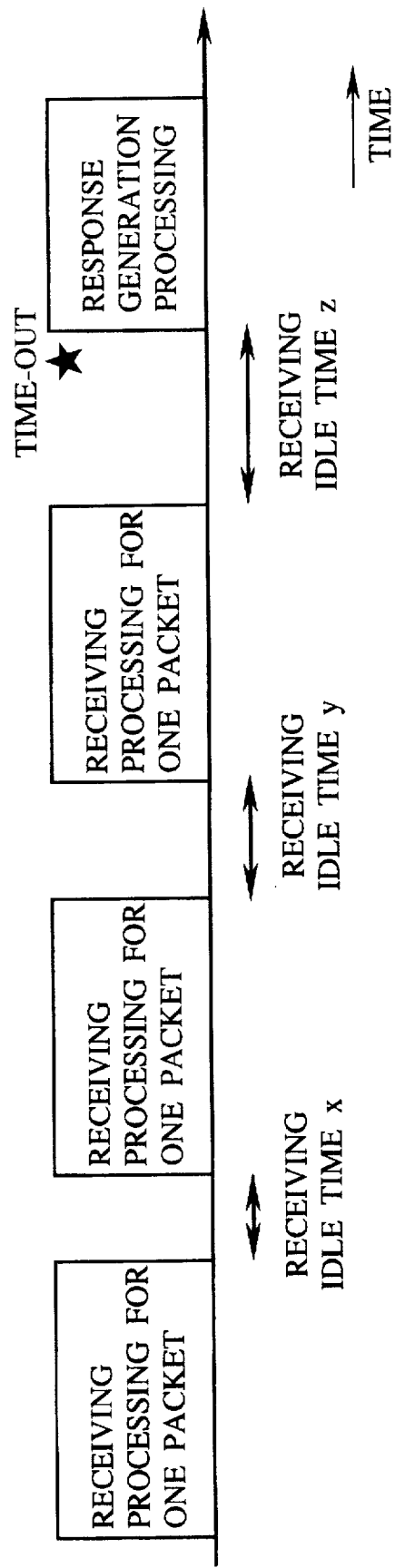
FIG. 14 is a diagram showing idle times at a receiving side used in the first embodiment of the present invention.

FIG. 13 shows transmission idle times during the data transmission at the server 100 side, for an exemplary case of carrying out the transmission rate adjustment in which the transmission processing is set in a wait state for a prescribed period of time every time n packets are transmitted consecutively. Also, FIG. 14 shows idle times during the data receiving at the terminal 200 side, including an idle time between the receiving processings of two packets and an idle time until the time-out occurs while waiting for a next packet. In this example, the terminal 200 carries out a processing for generating a response to the server 100 after the time-out occurs.

Consequently, the data transmission unit 120 of the server 100 carries out the processing as described above during the transmission idle times a, b, c shown in FIG. 13, so as to scramble the data packets and transmit the scrambled data packets to the terminal 200. Also, the data receiving unit 220 of the terminal 200 carries out the processing as described above during the receiving idle times x, y, z shown in FIG. 14, so as to receive the data packets from the server 100 and descramble the received packets.

Now, some terms used in the following description will be defined here.

In the following, the entire data whose transmission is specified from the application unit 110 of the server 100 will be called a message. A transfer data unit obtained by dividing the message will be called a data packet.

The data packet has a format as shown in FIG. 11 described above, where data obtained by dividing the message is stored into the user data 403, and the packet sequence number 402 starting from "1" is assigned sequentially from the top of the message. The data packet is transmitted to the terminal 200 by attaching the destination 401. In a case where the destination 401 is not attached, the data is stored into a packet of a lower hierarchical level according to the communication hierarchy, and transmitted to the termial 200.

The size of the data packet is set according to the granularity of the required scrambling. The smaller packet size makes it more difficult to decode the data. In the following, an exemplary case of the scrambling delivery within a block of 64 packets will be described, but by increasing a number of packets constituting each block, it becomes more difficult to decode the data.

The scrambling key is owned by the server 100 and the descrambling key is distributed to each terminal 200, either by a communication such as a file transfer for each terminal by the server 100, or by an advanced off-line delivery to terminals registered in the information delivery service.

It is assumed that the server 100 notifies the fact that the scrambling delivery is carried out, and a padding value used, to the terminal 200 before the data transfer, by means such as a connection establishing request packet.

Now, the transmission procedure of the server 100 will be described. Here, it is assumed that the following operations are to be carried out by utilizing the packet transmission idle times due to the transmission rate adjustment.

(1) Scrambling in unit of 64 packets:

Among 64 packets, the packet sequence numbers are permuted and the false packet sequence numbers are attached. Then, the processing to transfer the data packet in an order of the false packet sequence numbers is repeated for 64 times.

(2) Padding:

When the message given from the application unit 110 of the server 100 is not divisible by 64, padding packets (empty packets) are inserted to obtain a psuedo-message which is a multiple of 64.

As for the data packet descrambling procedure at the terminal 200, whenever the data receiving unit 220 receives the data packet, the false packet sequence number in the packet sequence number 402 is convereted into the true packet sequence number according to the descrambling key during the idle time of the receiving processing.

Next, a concrete example of the scrambling delivery and descrambling using the scrambling key and the descrambling key according to this first embodiment will be described.

(1) A scrambling delivery from the server 100 to the terminal 200:

In this example, the description using 8 packets will be used for the sake of simplicity.

At the server 100, suppose that the message packets have the following sequence number series:

"1, 2, 3, 4, 5, 6, 7, 8", and the scrambling key stored in the scrambling key memory unit 122 is given by:

"6, 3, 7, 2, 1, 8, 4, 5", where this scrambling key indicates that the packet with the sequence number "5" is to be transmitted as the first packet as indicated by "1" at the fifth position in the scrambling key, the packet with the sequence number "4" is to be transmitted as the second packet as indicated by "2" at the fourth position in the scrambling key, and so on.

Consequently, the false packet sequence number series on the communication network 300 is given by:

"1, 2, 3, 4, 5, 6, 7, 8", but the corresponding true packet sequence number series is given by:

"5, 4, 2, 7, 8, 1, 3, 6".

The above example is a case of using 8 packets, but the same procedure will be used in a case of using 64 packets as well.

The server 100 repeats this scrambling delivery at the idle times. The above processing is carried out for the packet sequence numbers "1" to "64" first, for the packet sequence numbers "65" to "128" next, and so on. The same scrambling key will be used, and the scrambling is applied to the packet sequence number modulo 64. This processing is carried out for the entire data in unit of 64 packets.

(2) A descrambling at the terminal 200:

When the terminal 200 of the receiving side receives the packets with the packet sequence number series given by:

"1, 2, 3, 4, 5, 6, 7, 8", the descrambling key stored in the descrambling key memory unit 222 is given by:

"5, 4, 2, 7, 8, 1, 3, 6", which is the same as the true packet sequence number series, and this descrambling key can be easily generated from the scrambling key. This descrambling key indicates that, while receiving the packets, the false packet sequence number "1" is to be converted into the true packet sequence number "5" as indicated by "5" at the first position in the descrambling key, the false packet sequence number "2" is to be converted into the true packet sequence number "4" as indicated by "4" at the second position in the descrambling key, and so on.

This descrambling processing is carried out for all the received packets.

(3) A response for the re-transmission:

Next, the processing by the server 100 to carry out the re-transmission for unreceived packets of the terminal 200 will be described.

The terminal 200 sends a response to the server 100 which contains the false packet sequence numbers of the unreceived packets as a negative acknowledgement. Upon receiving this response, the server 100 re-transmits the scrambled data packets similar to those originally transmitted as the re-transmission packets to the terminal 200.

(4) A processing after the data receiving:

After the entire message is received, the data reconstruction unit 223 of the terminal 200 removes the padding packets, and obtains the original message by rearranging the divided data in an order of the true packet sequence numbers.

Note that, the first embodiment described above is directed to a case of applying the present invention to both the server 100 and the terminal 200 simultaneously, but it is also possible to apply the present invention in such a manner that the processing after the data receiving is not carried out at the terminal 200 immediately. In such a case, the delivery information is simply given to the user first, and then the user descrambles the information by utilizing the descrambling key and removes the padding packets used in a case where the message is not divisible by a prescribed packet number so as to obtain the original information, by using a separate application program. This is an effective measure in a case where the same terminal can be used by the registered user as well as the non-registered user.

In this modified case, the descrambling processing load is on the user, but it is possible to prevent the utilization of the delivery information by the non-registered user, and it becomes possible to deliver the fee-charging information only to the registered user.

Figure 15:
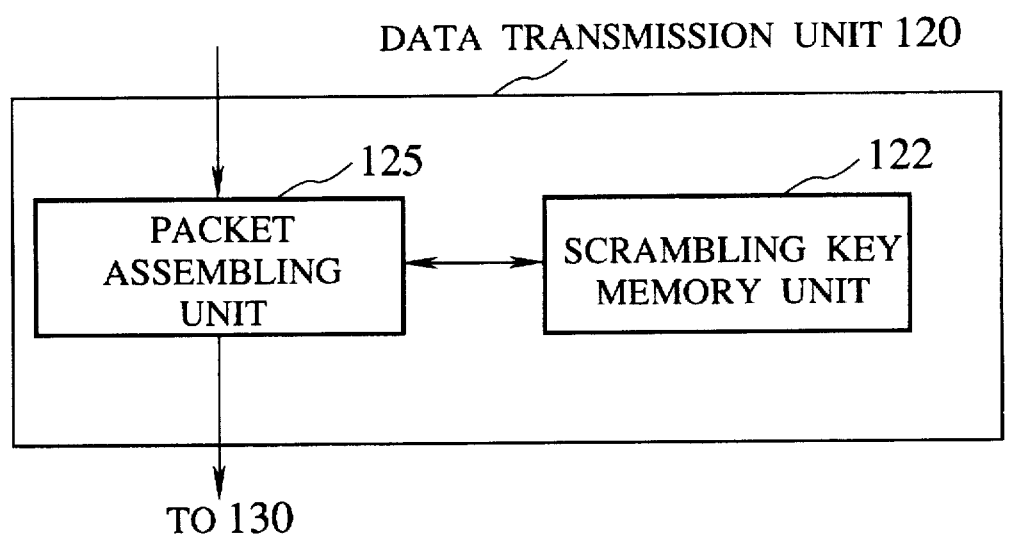
FIG. 15 is a block diagram of a data transmission unit in the packet scrambling communication system of FIG. 9 according to the second embodiment of the present invention.
Figure 16:
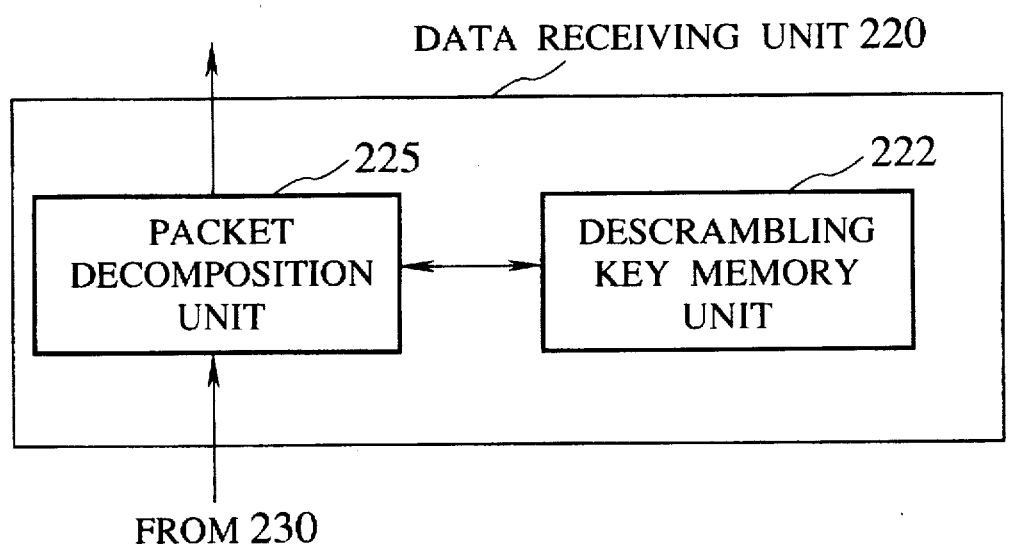
FIG. 16 is a block diagram of a data receiving unit in the packet scrambling communication system of FIG. 9 according to the second embodiment of the present invention.

Next, with references to FIG. 15 and FIG. 16, the second embodiment of a method and a system for packet scrambling communication according to the present invention will be desribed in detail.

In this second embodiment, the configuration of the information delivery system is similar to that shown in FIG. 8, and the internal configurations of the server 100 and the terminal 200 in the system are similar to those shown in FIG. 9.

FIG. 15 shows a detail configuration of the data transmission unit 120 in the server 100 of this second embodiment. As shown in FIG. 15, this data transmission unit 120 comprises a packet assembling unit 125 and the scrambling key memory unit 122 similar to that of FIG. 10. The packet assembling unit 125 of the data transmission unit 120 takes out the data unit from the application unit 110 of the server 100, and generates the data packet by attaching the destination and the false packet sequence number. By means of this, compared with a case of converting the packet sequence number in the data packet generated in advance as in the first embodiment described above, the processing amount and the processing time can be reduced as much as those required for the packet sequence number conversion processing.

Namely, in this second embodiment, the processing to attach the false packet sequence number for the purpose of scrambling is integrally incorporated into the processing to generate the data packet by attaching the packet sequence number for the purpose of communication, so that the processing amount and the processing time are reduced accordingly.

FIG. 16 shows a detail configuration of the data receiving unit 220 in the terminal 200 of this second embodiment. As shown in FIG. 16, this data receiving unit 220 comprises a packet decomposition unit 225 and the descrambling key memory unit 222 similar to that of FIG. 12. In a case of carrying out the descrambling at the data receiving unit 220, the packet decomposition unit 225 calculates the true memory address from the false packet sequence number of each packet while receiving each packet. Consequently, compared with a case of once storing the received data units and re-ordering the received data units into true memory addresses as in the conventional case, the processing amount and the processing time can be reduced as much as those required for the data units re-ordering processing.

Namely, in this second embodiment, the processing to recover the true memory addresses for the purpose of descrambling is integrally incorporated into the processing to store the data according to the packet sequence numbers of the received data packets for the purpose of communication, so that the processing amount and the processing time are reduced accordingly.

For the calculation of the memory addresses of the data units corresponding to the flase packet sequence numbers at the server 100 and the calculation of the true memory addresses of the data units from the false packet sequence numbers at the terminal 200, it is possible to use the following simple calculation which gives rise to hardly any processing load. Here, the description using 8 packets will be used for the sake of simplicity again.

Namely, in accordance with the true packet sequence number series (descrambling key) stored in the descrambling key memory unit 222 of the terminal 200 which is given by:

"5, 4, 2, 7, 8, 1, 3, 6", which corresponds to the scrambling key stored in the scrambling key memory unit 122 of the server 100, the memory addresses of the data units to be transmitted with the false packet sequence numbers pf1 to pf8 can be obtained at the data transmission unit 120 of the server 100, in terms of the top memory address I of the transmission data and the data unit size d, sequentially as follows.

| False packet sequence number | Memory addresses |
|---|---|
| pf1 | I + (5 − 1)d |
| pf2 | I + (4 − 1)d |
| pf3 | I + (2 − 1)d |
| pf4 | I + (7 − 1)d |
| pf5 | I + (8 − 1)d |
| pf6 | I + (1 − 1)d |
| pf7 | I + (3 − 1)d |
| pf8 | I + (6 − 1)d |

Similarly, for the false packet sequence numbers pf9 to pf16, the corresponding memory address can be obtained as follows.

| False packet sequence number | Memory addresses |
|---|---|
| pf9 | I + (8 + 4)d |
| pf10 | I + (8 + 3)d |
| pf11 | I + (8 + 1)d |
| pf12 | I + (8 + 6)d |
| pf13 | I + (8 + 7)d |
| pf14 | I + (8 + 0)d |
| pf15 | I + (8 + 2)d |
| pf16 | I + (8 + 5)d |

The general expressions for the memory addresses corresponding to the false packet sequence numbers pf(8n+1) to pf(8n+8) can be given as follows, where n is an integer greater than or equal to 0.

| False packet sequence number | Memory addresses |
|---|---|
| pf(8n + 1) | I +(8n + 4)d |
| pf(8n + 2) | I +(8n + 3)d |
| pf(8n + 3) | I +(8n + 1)d |
| pf(8n + 4) | I +(8n + 6)d |
| pf(8n + 5) | I +(8n + 7)d |
| pf(8n + 6) | I +(8n + 0)d |
| pf(8n + 7) | I +(8n + 2)d |
| pf(8n + 8) | I +(8n + 5)d |

At the data receiving unit 220 of the terminal 200, in accordance with the true packet sequence number series (descrambling key) stored in the descrambling key memory unit 222 of the terminal 200 as noted above, the true memory addresses of the data units can be calculated from the false packet sequence numbers pfx similarly according to the correspondences noted above, by sharing the same calculation procedure as in the server 100. In this manner, the data units can have the same memory addresses on the server 100 and the terminal 200.

Note however that, in a modified case of not carrying out the processing after the data receiving at the terminal 200 as mentioned above in relation to the first embodiment, the data storing scheme just described will not be used.

As described, in this second embodiment, the false packet sequence numbers are directly calculated from the memory addresses of the data units and attached to the data packets at the packet assembling unit 125 of the server 100, using the common calculation procedure shared with the terminal 200, while the true memory addresses of the data units are directly calculated from the false packet sequence numbers of the data packets at the packet decomposition unit 225 of the terminal 200, using the common calculation procedure shared with the server 100.

Next, with references to FIG. 17 to FIG. 19, the third embodiment of a method and a system for packet scrambling communication according to the present invention will be described in detail.

The first and second embodiments described above are directed to a case of the end-to-end packet scrambling communication between the server and the terminal, but the similar packet scrambling communication can be separately applied between the server and a relay device, between relay devices, and/or between a relay device and the terminal, according to the need. This third embodiment is directed to such a case of the packet scrambling communication through relay devices.

Figure 17:
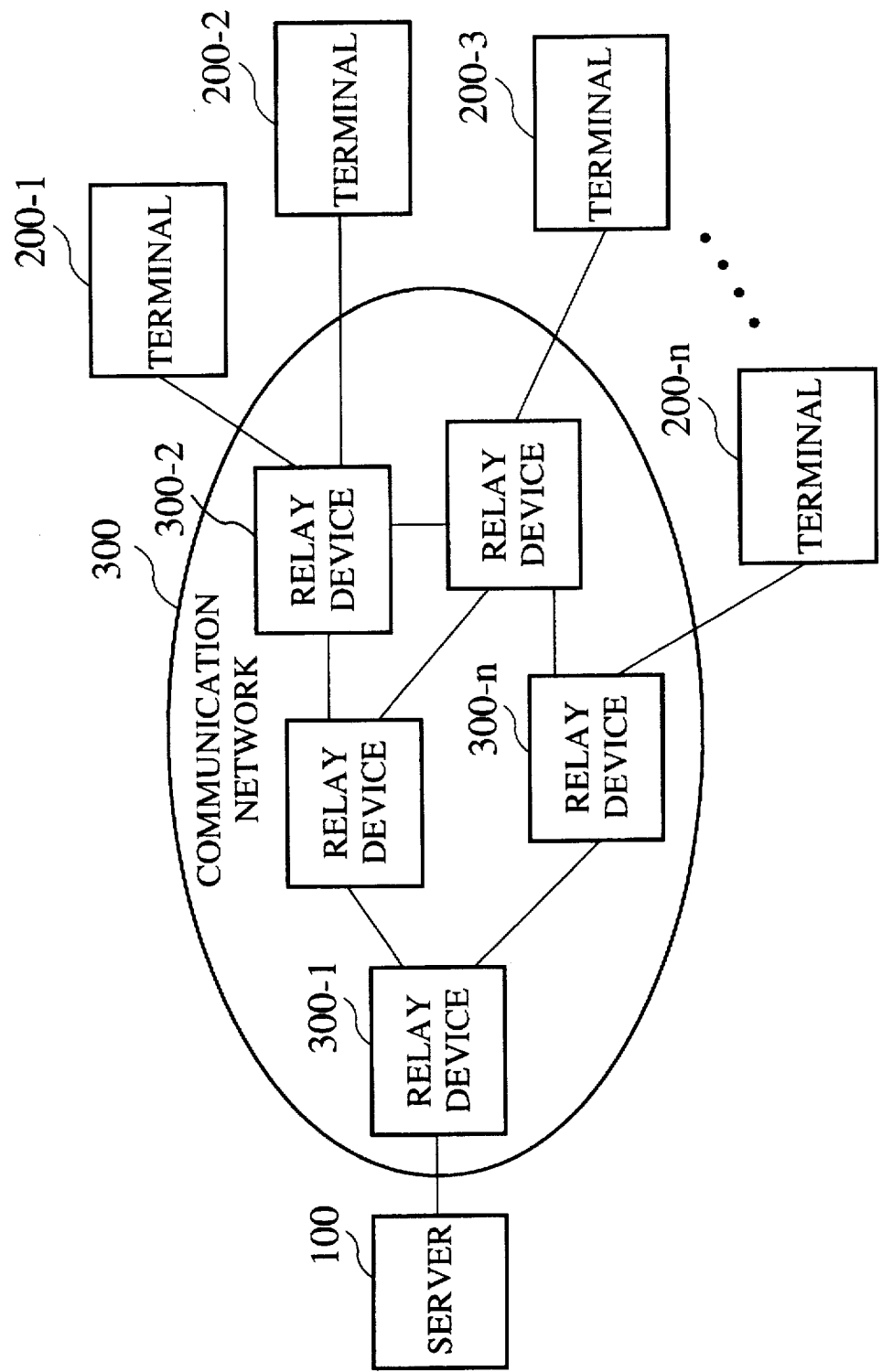
FIG. 17 is a schematic block diagram of an information delivery system according to the third embodiment of the present invention.

FIG. 17 shows an information delivery system in this third embodiment, which includes relay devices 300-1 to 300-n provided in the communication network 300 in addition to the configuration of FIG. 8. Here, the server 100 is connected with the relay device 300-1, the relay devices 300-1 to 300-n are connected through network channels, the relay device 300-2 is connected with the terminals 200-1 and 200-2, and so on. In this system of FIG. 17, the packet scrambling communication is to be carried out separately between the server and a relay device, between relay devices, and/or between a relay device and the terminal, according to the need.

Figure 18:
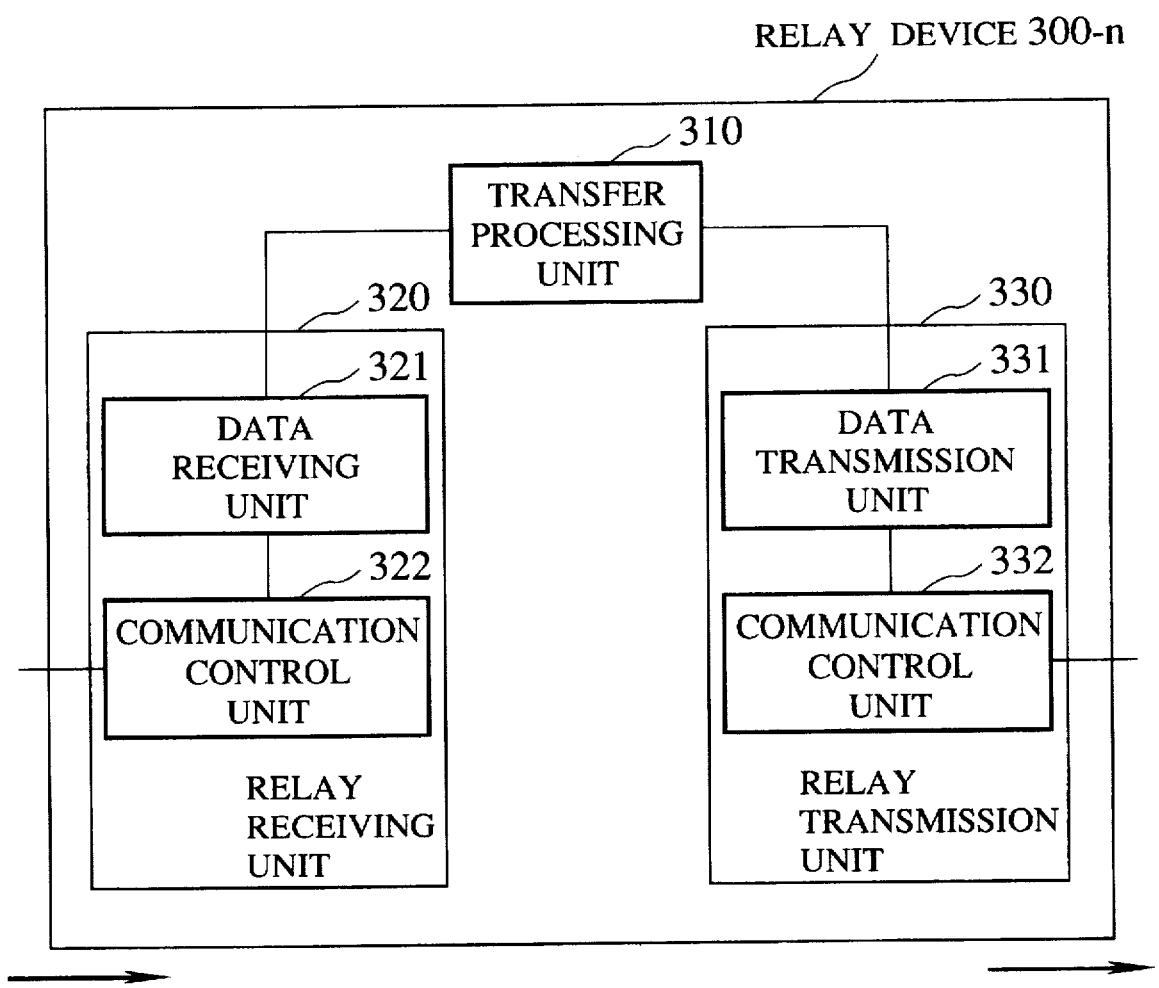
FIG. 18 is a block diagram of a relay device in the information delivery system of FIG. 17 according to the third embodiment of the present invention.

FIG. 18 shows an internal configuration of the relay device 300-n in the system of FIG. 17.

As shown in FIG. 18, the relay device 300-n comprises a transfer processing unit 310, a relay receiving unit 320, and a relay transmission unit 330, where the relay receiving unit 320 further comprises a data receiving unit 321 and a communication control unit 322, while the relay transmission unit 330 further comprises a data transmission unit 331 and a communication control unit 332.

Here, the data receiving unit 321 and the communication control unit 322 of the relay receiving unit 320 has the same functions as the data receiving unit 220 and the communication control unit 230 of the terminal 200 shown in FIG. 9 described above.

The transfer processing unit 310 carries out the destination conversion processing for the data packet to be relayed.

Figure 19:
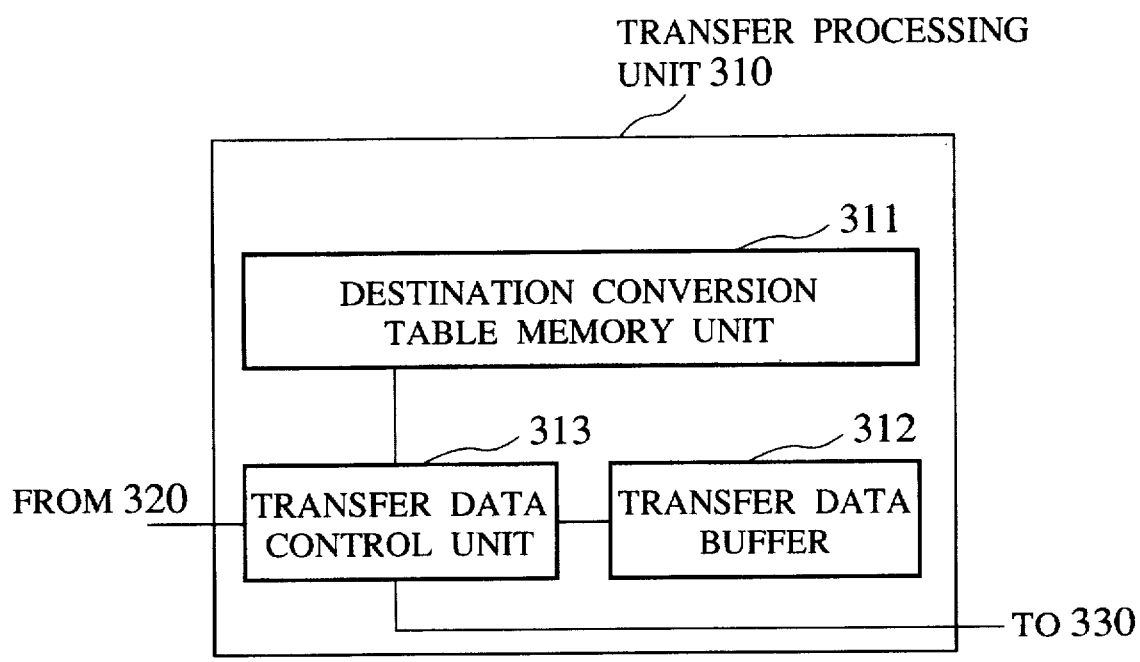
FIG. 19 is a block diagram of a transfer processing unit in the relay device of FIG. 18 according to the third embodiment of the present invention.

FIG. 19 shows a detail configuration of the transfer processing unit 310 in the relay device 300-n. As shown in FIG. 19, the transfer processing unit 310 comprises a destination conversion table memory unit 311 for storing a destination conversion table, a transfer data buffer 312 for storing the received data packets, and a transfer data control unit 313 for executing the destination changing processing.

Note that the configuration of the relay device 300-n as described above is a usually used one in the relay device of a storage exchange type.

The data packet relay procedure in this relay device 300-n is as follows.

When the data packet is received from the data receiving unit 321 at the transfer processing unit 310, the destination conversion table in the destination conversion table memory unit 311 is referred, and the destination of the data packet is changed to a next transfer target relay device or the final delivery target terminal 200. When a suitable number of data units are accumulated, the transmission is requested to the data transmission unit 331. The data transmission unit 331 then carries out the packet transfer with respect to the next transfer target relay device or the terminal 200.

In the transfer processing unit 310, the transfer data control unit 313 stores the received data into the transfer data buffer 312, and changes the destination of the data packet by referring to the destination conversion table in the destination conversion table memory unit 311.

By carrying out the packet scrambling communication through the relay devices in the communication network 300 in this manner, it is possible to realize the communication in which the secrecy can be maintained even in a case of the communication in the composite network.

Note that, in FIG. 17, for the network channels of the communication network 300, between the server and the relay device, between the relay devices, and between the relay device and the terminal, it is possible to use any desired one of various known transmission forms including a terrestrial ISDN, a wire transmission such as that of a dedicated line system, a satellite transmission, a radio transmission such as that of a cellular system, etc. Also, for the relay device, it is possible to use any desired one of a packet switch, an ATM switch, a router, etc.

Next, with reference to FIG. 20, an exemplary case of the electronic newspaper delivery system in which the packet scrambling communication of the present invention is carried out between the information delivery service subscriber and the information service center will be described.

Figure 20:
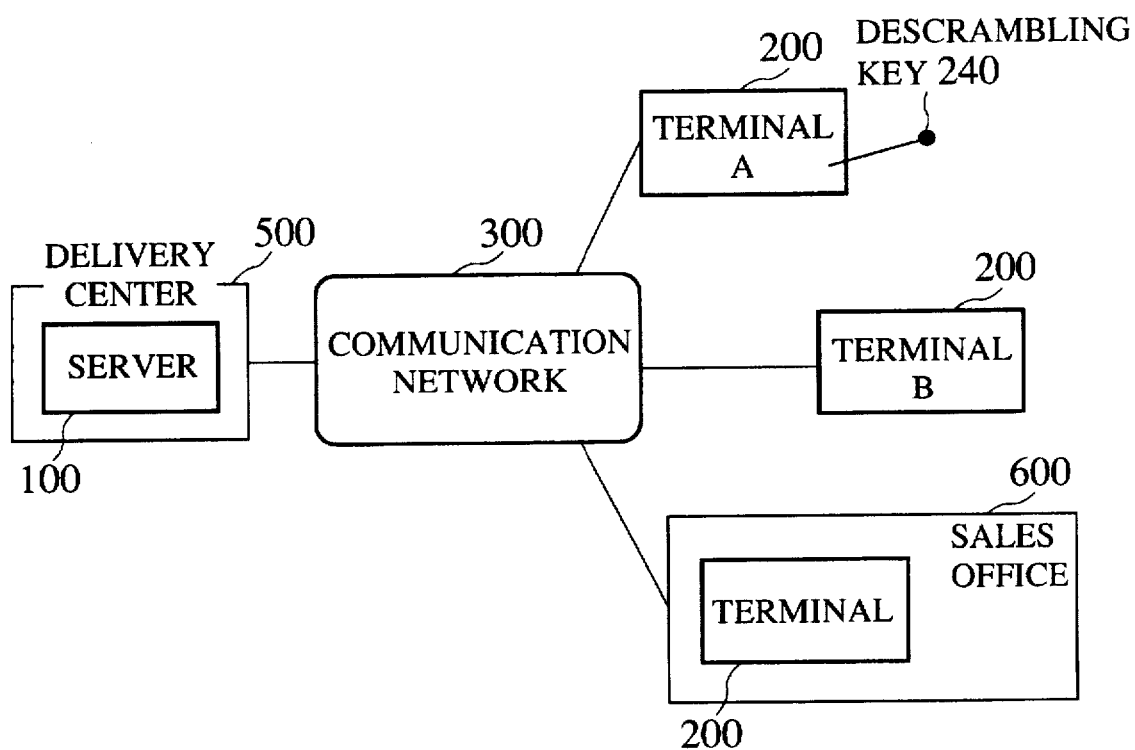
FIG. 20 is a schematic block diagram of an electronic newspaper delivery system to which the packet scrambling communication according to the present invention is applied.

FIG. 20 shows the electronic newspaper delivery system to which the present invention is applied. This system comprises a delivery center 500 containing a server 100, a plurality of terminals 200 including one contained in a sales office 600, and a communication network 300 connecting the server 100 and the terminals 200.

For a reader who does not own a terminal 200, the electronic newspaper copied at the sales office 600 is to be distributed at the sales office 600.

Every morning, the electronic newspaper is distributed from the server 100 to all the terminals 200 at once by the multicast communication, and here the packet scrambling communication according to the present invention is utilized. To the terminals 200 of the users who subscribed for the electronic newspaper, the descrambling key (a number sequence) is distributed in advance by the safe method. The non-registered user may wiretap the communication but the transmission data cannot be easily decoded without the descrambling key. For example, in FIG. 20, the user at the terminal A has the descrambling key 240 so that this user can obtain the electronic newspaper by the packet scrambling communication, but the non-registered user at the terminal B does not have the descrambling key 240 so that this user cannot obtain the electronic newspaper.

By renewing the descrambling key regularly, and not distributing the latest descrambling key to those users who failed to pay the subscription fee, it is possible to make the electronic newspaper unavailable to such users.

Next, with reference to FIG. 21, an exemplary case of applying the packet scrambling communication of the present invention only to a part of the information network system will be described.

Figure 21:
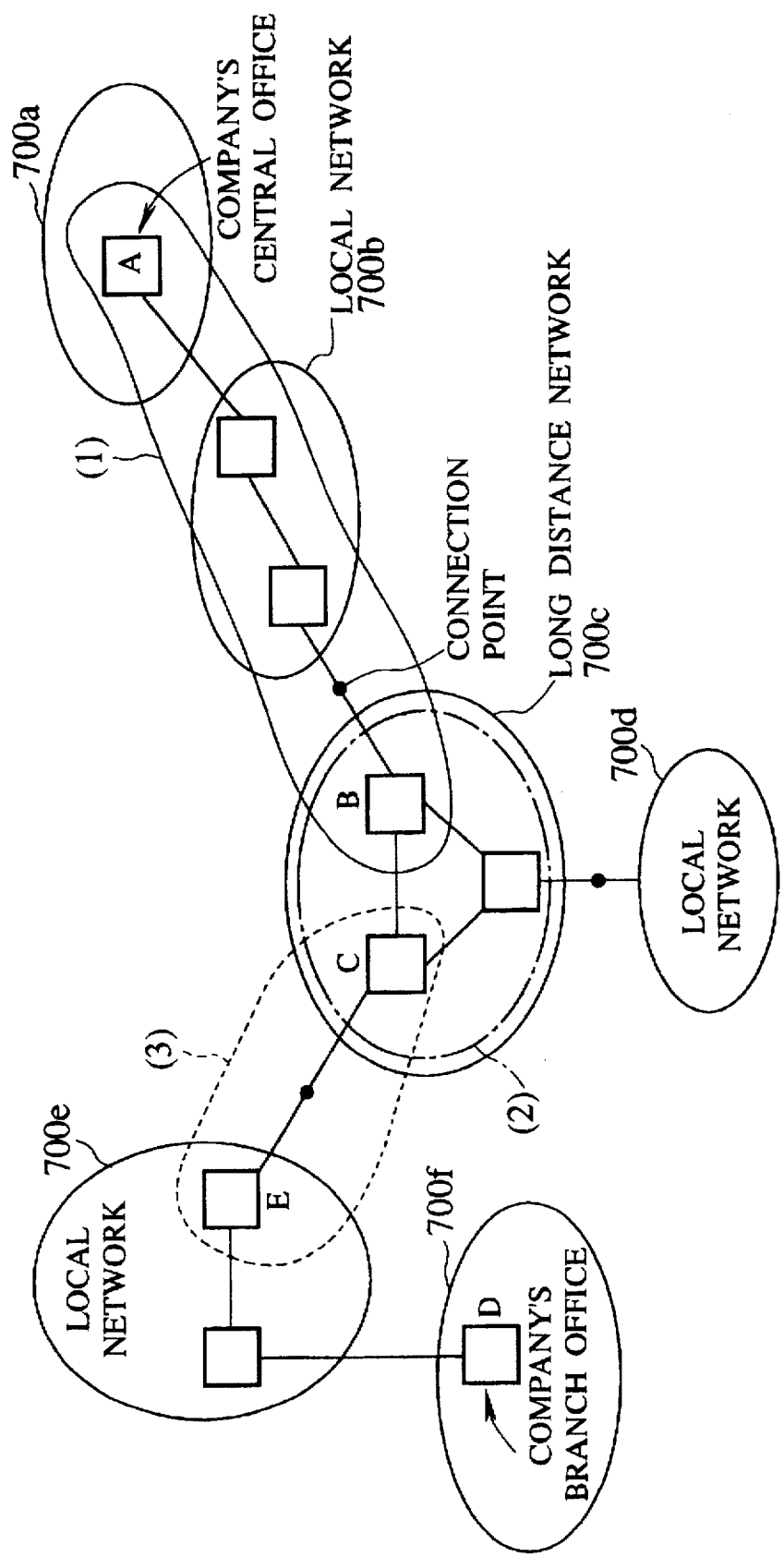
FIG. 21 is a schematic block diagram of an information network system to which the packet scrambling communication according to the present invention is partially applied.

FIG. 21 shows an information network system to which the present invention is applied only partially. This information network system includes information networks 700a to 700f, of which the network 700a has a relay device or terminal device A of some company's central office, and the network 700f has a relay device or terminal device D of the same company's branch office, while the network 700c has a relay device B and a relay device C.

In such an information network system, in a case of carrying out communications between the terminal A at the company's central office in the network 700a and the terminal D at the company's branch office in the network 700f, the packet scrambling communication of the present invention can be applied between the long distance network 700c and the company's terminals A and D. Here, when a local network 700b which does not guarantee the safety or a public connection point exists between the user company and the long distance network 700c, the communication can be carried out as follows.

(1) The packet scrambling communication according to the present invention can be carried out between the terminal A at the company's central office and the relay device B of the long distance network 700c.

(2) The long distance network 700c has many public connection points so that there is a possibility of an improper access, and for this reason, the packet scrambling communication according to the present invention can be carried out between the relay devices B and C of the long distance network 700c.

(3) The packet scrambling communication according to the present invention can be carried out between the relay device E of the local network 700e and the relay device C of the long distance network 700c.

By applying the packet scrambling communication according to the present invention sequentially to each network in this manner, it is possible to guarantee the secrecy.

Note that, in the above, A and D are assumed to be the company's terminals, but the similar application of the present invention is possible for a case where A and D are the relay devices in the company to which a plurality of terminals in the company are to be connected in order to carry out communications.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for packet scrambling communication between a transmitting side and a receiving side connected through a network, comprising the steps of:

scrambling original data at the transmitting side, by dividing the original data into a plurality of data-units, assembling packets by storing the data-units in the packets and attaching to the packets scrambled packet identifiers indicating a scrambled packet order so that the packets can be scrambled by being rearranged according to the scrambled packet identifiers, and transmitting the packets in the scrambled packet order according to the scrambled packet identifiers from the transmitting side to the network;

descrambling the packets received from the network at the receiving side, by recovering data-unit order information indicating a descrambled order of the data-units from the scrambled packet identifiers, and reconstrucitng the original data from the data-units stored in the packets according to the data-unit order information.

2. The method of claim 1, wherein:

the scrambing step assembles the packets by attaching to the packets non-scrambled packet identifiers indicating a non-scrambled packet order, and replacing the non-scrambled packet identifiers by the scrambled packet identifiers according to a prescribed scrambing key; and the descrambling step recovers data-unit order information by converting the scrambled packet identifiers into the non-scrambled packet identifiers according to a prescribed descrambling key corresponding to the prescribed scrambling key, and using the non-scrambled packet identifiers as the data-unit order information in reconstructing the original data.

3. The method of claim 1, wherein:

the scrambling step assembles the packets by directly calculating the scrambled packet identifiers from memory addresses of the data-units according to a prescribed calculation procedure; and the descrambling step recovers the data-unit order information by directly calculating the memory addresses of the data-units from the scrambled packet identifiers according to the prescribed calculation procedure, and using the memory addresses as the data-unit order information in reconstructing the original data.

4. The method of claim 1, wherein the scrambling step is carried out by a protocol processing at the transmitting side.

5. The method of claim 1, wherein the descrambling step is carried out by a protocol processing at the receiving side.

6. The method of claim 1, wherein the scrambling step divides the original data and assembles the packets during idle times available in a process for transmitting the packets.

7. The method of claim 1, wherein the descrambling step recovers the data-unit order information and reconstructs the original data during idle times available in a process for receiving the packets.

8. The method of claim 1, wherein the scrambling step transmits a prescribed number of the packets together, and when the original data is not divisible by the prescribed number, the scrambling step assembles the packets by inserting at least one padding packet so as to form the prescribed number of the packets to be transmitted together.

9. The method of claim 1, further comprising the steps of:

sending a negative acknowledgment indicating the scrambled packet identifiers of unreceived packets from the receiving side to the transmitting side; and re-transmitting the packets with the scrambled packet identifiers corresponding to the unreceived packets from the transmitting side to the receiving side according to the scrambled packet identifiers indicated in the negative acknowledgement.

10. The method of claim 1, further comprising the step of:

relaying the packets transmitted from the transmitting side at a relay device provided in the network, by changing a destination specified in each packet according to a destination conversion table provided in the relay device, the destination conversion table indicating a next transfer target or a final destination of each packet corresponding to the destination specified in each packet.

11. A system for packet scrambling communication, comprising:

a network;

a transmission device connected with the network, including:

scrambling processing means for scrambling original data, by dividing the original data into a plurality of data-units, and assembling packets by storing the data-units in the packets and attaching to the packets scrambled packet identifiers indicating a scrambled packet order so that the packets can be scrambled by being rearranged according to the scrambled packet identifiers; and transmission means for transmitting the packets in the scrambled packet order according to the scrambled packet identifiers to the network; and a receiving device connected with the network, including:

receiving means for receiving the packets from the network; and descrambling processing means for descrambling the packets, by recovering data-unit order information indicating a descrambled order of the data-units from the scrambled packet identifiers, and reconstructing the original data from the data-units stored in the packets according to the data-unit order information.

12. The system of claim 11, wherein:

the scrambling processing means assembles the packets by attaching to the packets non-scrambled packet identifiers indicating a non-scrambled packet order and replacing the non-scrambled packet identifiers by the scrambled packet identifiers according to a prescribed scrambing key; and the descrambling processing means recovers the data-unit order information by converting the scrambled packet identifiers into the non-scrambled packet identifiers according to a prescribed descrambling key corresponding to the prescribed scrambling key, and using the non-scrambled packet identifiers as the data-unit order information in reconstructing the original data.

13. The system of claim 11, wherein:

the scrambling processing means assembles the packets by directly calculating the scrambled packet identifiers from memory addresses of the data-units according to a prescribed calculation procedure; and the descrambling processing means recovers the data-unit order information by directly calcualting the memory addresses of the data-units from the scrambled packet identifiers according to the prescribed calculation procedure, and using the memory addresses as the data-unit order information in reconstrucing the original data.

14. The system of claim 11, wherein the scrambling processing means divides the original data and assembles the packets by executing a protocol processing.

15. The system of claim 11, wherein the descrambling processing means recovers the order information and reconstructs the original data by executing a protocol processing.

16. The system of claim 11, wherein the scrambling processing means divides the original data and assembles the packets during idle times available in a process for transmitting the packets by the transmission means.

17. The system of claim 11, wherein the descrabling processing means recovers the data-unit order information and reconstructs the original data during idle times available in a process for receiving the packets by the receiving means.

18. The system of claim 11, wherein the transmission means transmits a prescribed number of the packets together, and when the original data is not divisible by the prescribed number, the scrambling processing means assembles the packets by inserting at least one padding packet so as to form the prescribed number of the packets to be transmitted together.

19. The system of claim 11, wherein:

the receiving device further includes means for sending a negative acknowledgement indicating the scrambled packet identifiers of unreceived packets to the transmission device; and the transmission device further incudes means for retransmitting the packets with the scrambled packet identifiers corresponding to the unreceived packets to the receiving device according to the scrambled packet identifiers indicated in the negative acknowledgement.

20. The system of claim 11, further comprising:

a relay device, provided in the network, for relaying the packets transmitted from the transmission device, the relay device including:

a destination conversion table indicating a next transfer target or a final destination of each packet corresponding to a destination specified in each packet; and transfer means for changing the destination specified in each packet according to the destination conversion table, and transferring each packet with a changed destination to the network.

* * * * *